United States Patent [19]

Joannou

[11] Patent Number: 4,996,609
[45] Date of Patent: Feb. 26, 1991

[54] MAGNETIC HEAD RECORDING MULTITRACK SERVO PATTERNS

[75] Inventor: Kyriacos Joannou, Wayland, Mass.

[73] Assignee: Pericomp Corporation, Natick, Mass.

[21] Appl. No.: 313,719

[22] Filed: Feb. 22, 1989

[51] Int. Cl.$^5$ ............................................. G11B 5/02
[52] U.S. Cl. ................................ 360/57; 360/77.010; 360/121
[58] Field of Search ............. 360/55, 57, 77.06, 77.11, 360/119, 121, 77.01

[56] References Cited

U.S. PATENT DOCUMENTS

| | | | |
|---|---|---|---|
| 3,164,682 | 1/1965 | Anderson | 360/119 |
| 3,439,918 | 4/1969 | Walter | 360/121 |
| 3,859,664 | 1/1975 | Chynoweth et al. | 360/121 |
| 3,864,740 | 2/1975 | Sordello et al. | 360/77.11 |
| 3,893,188 | 7/1975 | Shoemaker | 360/121 |
| 4,149,198 | 4/1979 | Behr et al. | 360/77.06 |
| 4,346,418 | 8/1982 | Cullum et al. | 360/121 |
| 4,685,005 | 8/1987 | Fields, Jr. | 360/121 |
| 4,695,909 | 9/1987 | Momata et al. | 360/121 |

OTHER PUBLICATIONS

IBM Tech. Disc. Bulletin, vol. 25, No. 2, Jul. 1982, Re-Recordable Servo System for Multi-Track Tape, T. A. Schwarz, pp. 778–779.

*Primary Examiner*—Aritotelis M. Psitos
*Assistant Examiner*—David L. Robertson
*Attorney, Agent, or Firm*—Schiller, Pandiscio & Kusmer

[57] ABSTRACT

A novel apparatus and method is described for recording a pattern of track positioning servo signals at select locations of a magnetic tape for use in aligning a single track read head with each of the tracks defined by the signal pattern. The pattern is provided by recording two different signals with two write heads so that the signals are recorded as alternating strips. The differences between the two signals are then used to define the each track center.

34 Claims, 7 Drawing Sheets

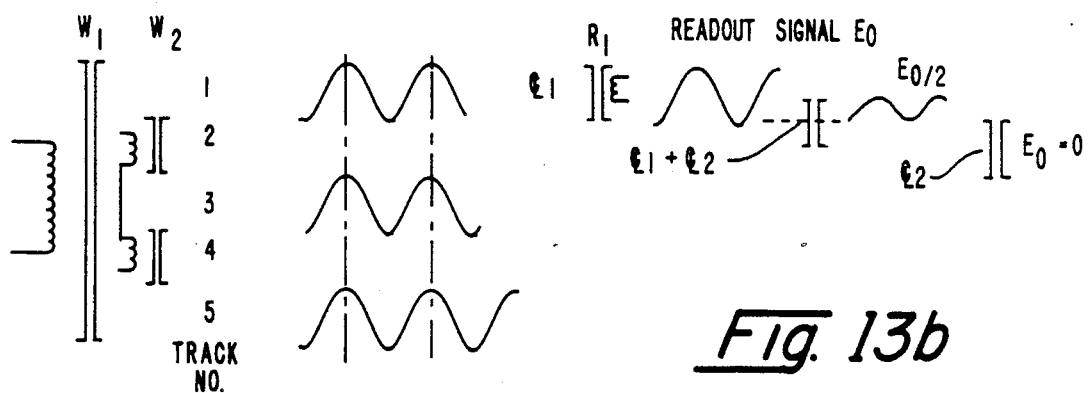
Fig. 13a
Fig. 13b
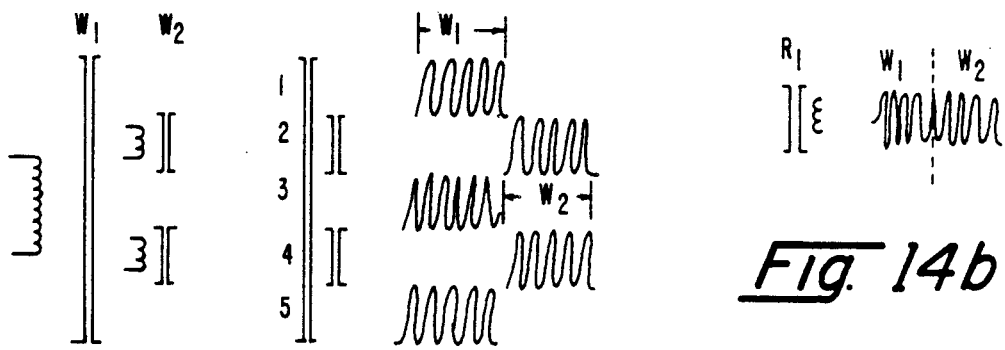
Fig. 14a
Fig. 14b

MAGNETIC HEAD RECORDING MULTITRACK SERVO PATTERNS

The present invention relates to accurate servo control alignment of a movable magnetic read head relative to each of the tracks of a multi-track magnetic data storage medium, and more specifically to a method of and apparatus for quickly and reliably prerecording servo control signals on a magnetic data storage medium for use in accurately controlling the position of a movable single track magnetic read head relative to each track.

For years the magnetic recording industry has been looking for ways to increase the data storage density of magnetic data storage media such as tape, and yet avoid problems such as mistracking. The amount of data stored on a particular sized tape, for example, is a function of both data packing density, how much data can be packed on each track, and the spacing between tracks. Obviously, the closer the tracks, the more data that can be stored on a specific length of tape. For example, commercially available magnetic tape for serving as a back up to other storage systems such as hard magnetic disks, or simply used for storing archival information, is capable of storing enormous amounts of information. Track widths currently range between 0.003 and 0.013 inches with narrower track widths less than 0.003 inches being tested in the industry. One of the limitations on increasing storage density beyond what is currently possible, particularly on cartridge tapes for storing digital information, is that the read/write magnetic heads used in the tape drives for storing and retrieving data from the tapes tend to be inexpensively made. The heads usually are made to read one track at a time so that a head positioning servo system must be provided for moving the head from track to track resulting in certain tolerances relating to such movement that limit track density.

More specifically, there are presently two common approaches for servo controlling a single track head relative to each track of a multi-track tape. One approach currently used by a majority of quarter inch tape drive manufacturers includes the step of recording a burst signal of information on one track at the beginning of the tape. This is the reference or zero track. The zero track is usually identified and defined by a line a predetermined distance from and parallel to an edge of the tape so that the head position servo control moves the single track read head relative to the edge to the zero track by the head's relative distance from the edge. The head positioning servo control seeks automatically to verify its center line with the center line of the zero track by stepping the read head toward or away from the reference edge (that is "up" or "down") in microsteps to find the burst signal at its maximum level. All other track center lines are then defined by corresponding predetermined distances from the reference track. The distance between the zero track and each of the other tracks is therefore measured with a tolerance depending on the resolution of the stepping mechanism for moving the magnetic head. Thus, the number of tracks on the recording medium is dependent upon the tolerances of the stepping mechanism, with 9 to 18 tracks being typical for quarter inch tape. The head positioning servo control moves the head the measured distance without any verification of accuracy.

Thus, a major problem with this first approach is that the track location is dependent upon the hardware since the hardware must accurately locate the zero track relative to the reference edge and then, when appropriate, locate a particular track with respect to the zero track. As a result a user may find it difficult to retrieve data from a tape using a tape drive which is different from the tape drive used to record the data due to incompatibilities of the two tape drives.

The other type of common head positioning system utilizes a prerecorded pattern of tracking or servo signals on each track to position the head accurately on each track. To record the servo pattern on each track is a time consuming process requiring as many passes of the tape from beginning to end as there are tracks. This process is very costly with the cost of the prerecorded tape depending on the number of tracks and the tape length. The time required to record servo patterns on the tape is directly proportional to the number of tracks for a specific length of tape. Typical lengths of tape in commercially available cartridges are 200 to 600 feet with 12 to 32 tracks usually being defined. It is obvious that this method of head positioning yields higher accuracy of tracking. It is also obvious that it is extremely time consuming to record the servo pattern on each track and much more costly to the tape cartridge manufacturers as when the first approach is used. For example, assuming a tape having a length of 200 feet is provided with 12 recording tracks, the time required to record a servo pattern using this second approach at a velocity of 50 inches per second each of the tracks would be in the range of 10 minutes plus a formatting time of an additional 10 minutes approximately. For 600 foot tapes and 24 recording tracks it would take approximately 2 hours to perform the recording of servo patterns and formatting. It can be seen therefore that the cost of such a servo pattern is prohibitive.

Accordingly, it is a general object of the present invention to reduce or substantially overcome the above-mentioned problems of the prior art.

More specifically, an object of the present invention is to provide an improved technique of precisely recording a pattern of servo signals for each track of a multi-track recording medium in a minimum amount of time.

And another object of the present invention is to provide an improved technique of recording a pattern of servo signals for each track of a multi-track magnetic recording tape in a predetermined period of time as a function of tape speed and tape length and irrespective of the number of channels.

And yet another object of the present invention is to provide an improved apparatus for carrying out the technique of the present invention.

These and other objects of the present invention are achieved by apparatus for prerecording track positioning signals on a magnetic recording medium so as to accurately and simultaneously predefine a plurality of spaced apart recording tracks on the recording medium across the recording width of the medium. The apparatus comprises:

magnetic head means for simultaneously writing a track positioning signal pattern across the recording width of the magnetic recording medium so as to simultaneously define the positions of the tracks on the medium as a function of the locations of the signals on the medium, the magnetic head means comprising (a) a first write head for recording a first signal pattern on the recording medium, and (b) a second write head, spaced from the first write head, for recording a second signal pattern on the recording medium so that the first and second signal patterns combine to create the track positioning signal pattern;

means for moving the magnetic recording medium relative to the first and second write heads so that the track positioning signal pattern is recorded on the medium; and means, coupled to the first and second write heads, for generating the first and second signal patterns as the recording medium is moved relative to the magnetic head means.

In accordance with another aspect of the present invention an improved method is provided for prerecording track positioning signals on a magnetic recording medium so as to accurately and simultaneously predefine a plurality of spaced apart recording tracks on the recording medium across the recording width of the medium. The method comprises the steps of:

simultaneously writing a track positioning signal pattern across the recording width of the magnetic recording medium so as to simultaneously define the positions of the tracks on the medium as a function of the locations of the signals on the medium, the step of writing comprising (a) recording a first signal pattern on the recording medium, and (b) recording a second signal pattern on the recording medium so that the first and second signal patterns combine to create the track positioning signal pattern;

moving the magnetic recording medium so that the track positioning signal pattern is recorded on the medium; and generating the first and second signal patterns as the recording medium is moved.

Other objects of the invention will in part be obvious and will in part appear hereinafter. The invention accordingly comprises the several steps and the relation of one or more of such steps with respect to each of the others and the apparatus possessing the construction, combination of elements, and arrangement of parts all of which are exemplified in the following detailed disclosure and the scope of the application of which will be indicated in the claims.

For a fuller understanding of the nature and objects of the present invention, reference should be had to the following detailed description taken in connection with the accompanying drawings wherein:

FIGS. 13a and 13b show an alternative track positioning signal pattern recorded on a tape in accordance with the method of the present invention and also illustrates a technique of reading the track positioning signal pattern shown in that Fig.;

Figure 15A:
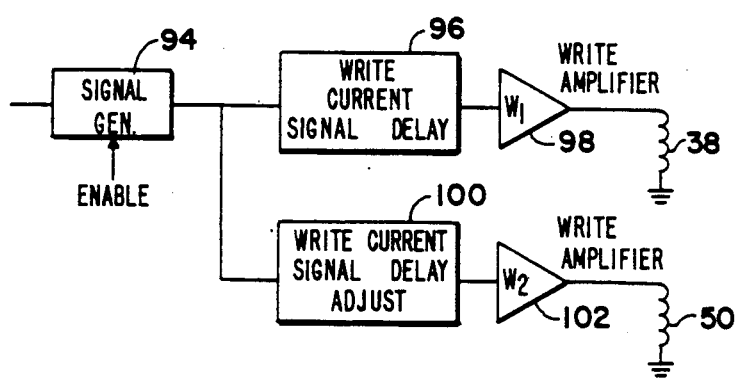
Figure 15B:
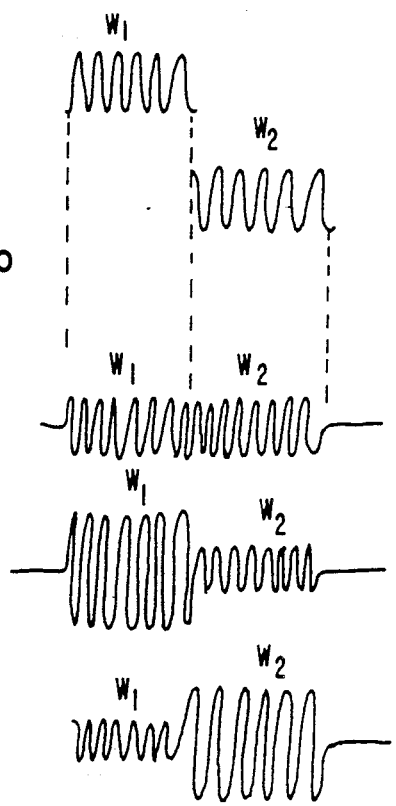

FIGS. 14a and 14b show yet another alternative track positioning signal pattern recorded on a tape in accordance with the method of the present invention and also illustrates a technique of reading the track positioning signal pattern shown in that Fig.; and FIGS. 15a and 15b show a partial block and partial schematic diagram of signal generating means for generating the track positioning signal pattern shown in FIG. 14 and variations of that pattern.

In the drawings the same numerals are utilized to refer to the same or similar parts.

Figure 1:
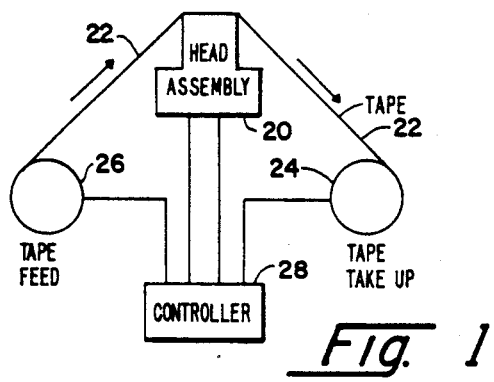
FIG. 1 is a partial block and partial schematic diagram of the apparatus of the present invention.

In accordance with the present invention the apparatus used to carry out the method is generally shown in FIG. 1, wherein a write head assembly 20 is used to record the track positioning signal pattern on the tape 22. The tape is moved over the assembly 20 by appropriate means in the form of a tape drive 24 for taking up the tape after it moves over the assembly 20, and a tape feed 26 for feeding tape in a a manner well known in the art. A controller 28 controls the tape drive 24, tape feed 26 in a well known manner and provides the necessary signals to the write head assembly 20 to provide the track positioning signal pattern on the tape. As will be more evident hereinafter the controller includes a signal generator for generating two signals which are applied to the tape through two different write or recording heads so as to provide the pattern.

Figure 2:
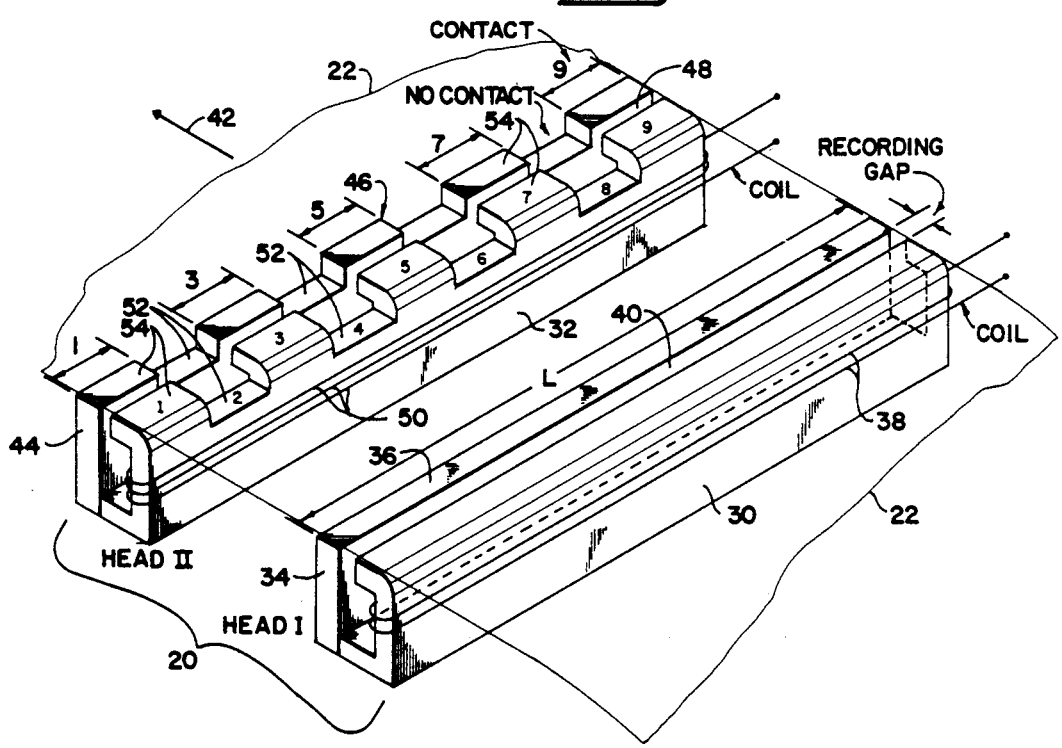
FIG. 2 shows a perspective view of the preferred embodiment of the write head assembly of the apparatus illustrated in FIG. 1.
Figure 3:
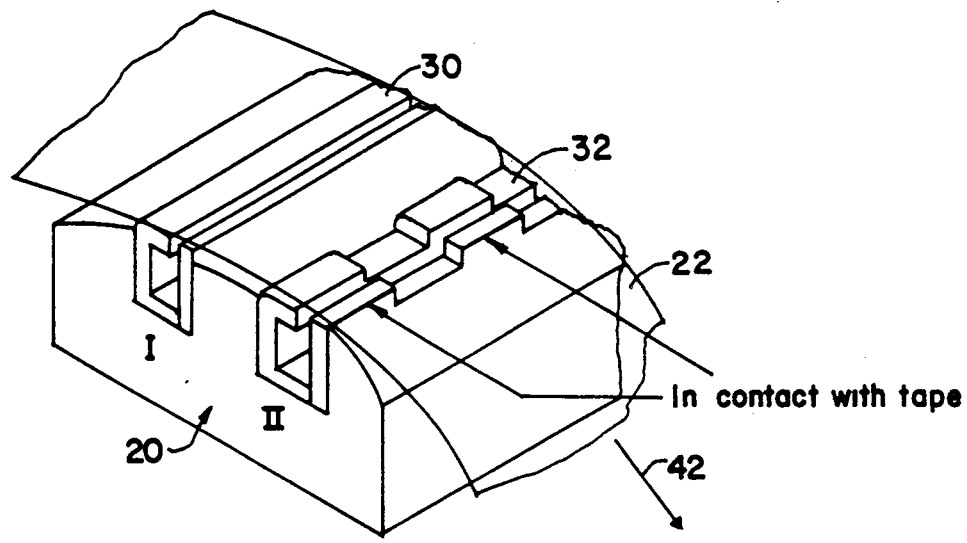
FIG. 3 shows a perspective view of the preferred embodiment of the write head assembly of the apparatus shown in FIG. 1 and modified so as to be mounted in a single housing.

More specifically, the write head assembly 20 includes two write or recording heads such as shown at 30 and 32 in FIG. 2. While the two heads 30 and 32 are shown as two separately mounted components relative to one another, the two heads are preferably mounted on a single housing so as to achieve more accurate registration with the tape 22 as shown in FIG. 3. The first recording head 30 is provided with a core 34 defining a top portion 36 for contacting the tape 22 as the latter is moved over the head and a coil 38 wrapped around the core 34 in a well known manner. A gap 40 is formed in the top portion for creating the magnetic field to which the tape is exposed as the tape moves over the top portion 36. The magnetic field is provided in response to and as a function of the signal applied to the coil 38. The top portion and gap each have a length dimension L substantially equal to the recording width of the recording tape moved over the head (i.e., the dimension of the tape normal to the direction 42 of movement of the tape 22). As will be more evident hereinafter, the signal applied to the tape by the head 30 as the tape is moved over the head will be recorded on substantially the entire width of the tape so as to provide a first recorded signal pattern on the tape. The tape is moved over the head 30 first before it is moved over the head 32.

The head 32 is identical to the head 30 (in that it includes a core 44 having a top portion 46 formed with the gap 48, and a coil 50 for providing a magnetic field across the gap 48 in response to and as a function of an electrical signal applied to the coil 50), except that the top portion is notched so as to provide a plurality of grooves or slots 52 disposed between and therefore defining the recording elements 54. As such as the tape 22 is moved over the head 32, after having been moved over the head 30, the recorded portions of the tape provided with the signal pattern from the head 30 and moved over the slots 52 will remain unaffected since the slots will not contact the tape. The recorded portions of the tape provided with the signal pattern from the head 30 and moved over the recording elements 54, however, will contact the head and therefore will be erased and replaced with the signal pattern provided by the head 32 in response to a signal provided on the coil 50. As will be more evident hereinafter, the composite signal pattern resulting from the first signal pattern recorded by the head 30 and the second signal pattern recorded by the head 32 are used to simultaneously define the specific track positions on the tape in an extremely accurate manner.

Figure 4:
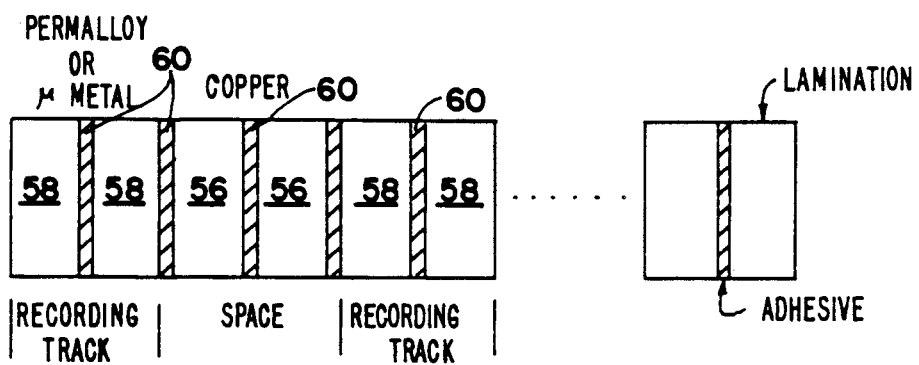
FIG. 4 shows a cross-section of a portion of a magnetic write head made in accordance with the teachings of the present invention.

The accuracy of the track positions thus defined are in part dependent on the accuracy of the construction of the head 32 and specifically the positions and dimensions of the slots 52 and recording elements 54. Both the contact and noncontact regions defined by the slots 52 and elements 54 must therefore be very precisely formed with relatively low tolerances, e.g., not greater than 3% of the desired track width. The actual head 32 can be constructed in accordance with any one of several methods. For example, recording heads are often made from laminations of magnetic materials bonded together. Keeping in mind that laminations of magnetic materials used in manufacturing magnetic recording heads are rolled with very high precision, slots and recording elements of 0.002 inch wide each can be made with tolerances of 3% of 0.002 inches. As shown in FIG. 4, for example, the non-contact slots 52 can be achieved by using copper laminations, indicated at 56 of the same thickness as the laminations of magnetic core material indicated at 58, typically made of a magnetically conductive material such as a permalloy or ferrite material, all of which are secured together with layers 60 of suitable adhesive.

Another method used to construct the head 32 is to build a core similar to the core of write head 30 which records the full width of the tape and remove material where the non-contact slots 52 are desired. The material can be removed by electrical discharge, for example, with a EDM or electrical discharge machine. The depth of the recessed slots 52 is sufficient so that the the tape portions traveling directly over the slots will be unaffected, with a depth of about 0.006 to 0.010 inches being adequate for the average life of a magnetic head.

A third method by which material can be removed from the surface of the recording heads made out of metal or ferrite material is by laser etching or grinding.

The widths of the slots 52 and elements 54 are sufficient so that the tracks defined by the composite track positioning signal pattern provided on the tape 22 will be sufficiently close to one another to provide high track density. The spaces between the tracks can be as wide as the tracks themselves, or narrower if desired, depending on the composite signal pattern recorded on the tape and the method of detection.

Figure 5:
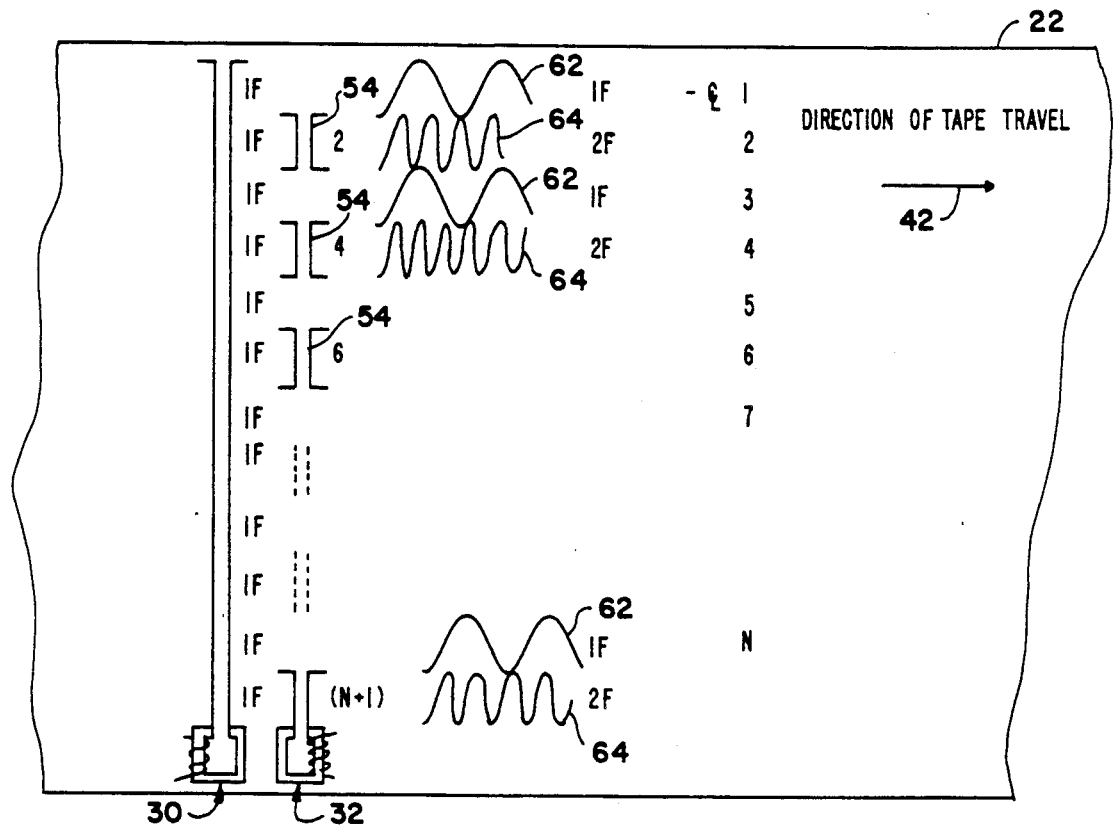
FIG. 5 shows a track positioning signal pattern recorded on a tape in accordance with the method of the present invention.

For example, as shown in FIG. 5 an example of a composite signal pattern is formed by providing a first sinusoidal signal of a first frequency $F_1$ to the coil 38 of the first head 30 so that substantially the entire width of the portion of the tape recorded with the first signal is provided with this first signal pattern. This first pattern is indicated by the numeral 62. As this portion of the tape is moved over the head 32 the second signal pattern is formed by providing a second sinusoidal signal of a second frequency $F_2$ different from $F_1$, e.g., $F_2=2F_1$. This signal pattern will be recorded over the first signal pattern where the portion of the tape contacts each of the recording elements so as to form strips of a different signal pattern as indicated at numeral 64 from the pattern 62.

Figure 6:
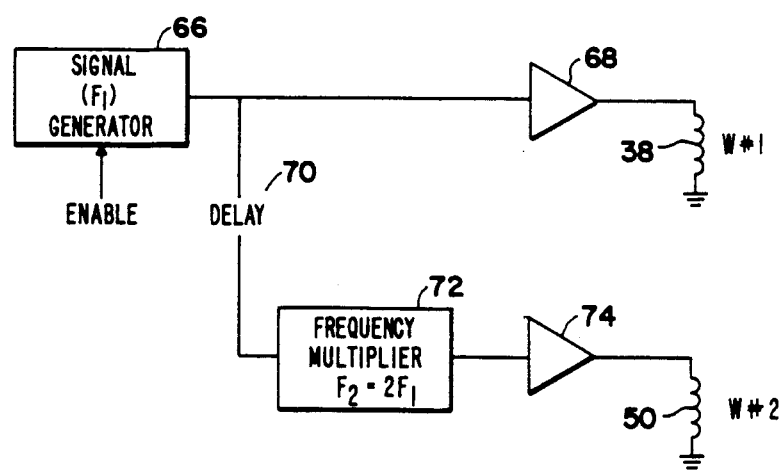
FIG. 6 shows a partial block and partial schematic diagram of signal generating means for generating the track positioning signal pattern shown in FIG. 5.

The signals at frequencies $F_1$ and $F_2$ can easily be generated as shown in FIG. 6, wherein a single signal generator 66 is turned on and off with an enable signal received from the controller 28 (shown in FIG. 1). In the example given the signal generator 66 is a sinusoidal signal generator for generating the signal at a frequency of $F_1$. The signal is applied to the signal amplifier 68, which amplifies the signal before applying the signal to the coil 38 of the head 30. The signal provided by the generator 66 is also applied to a signal delay 70. The delay is sufficient to take into account the time it takes for a specific part of the tape to move from the head 30 to the head 32. The delayed signal output from delay 70 is applied to a frequency shifter 72 shown in the example as a signal multiplier for multiplying the frequency by a factor of two. The frequency shifted signal is then applied to the amplifier 74 which in turn applies its output to the coil 50 of the head 32. As shown in FIG. 5, numbering the elements 54 and slots 52 consecutively from one end of the head 32 to the other end, the resulting composite signal pattern recorded on the tape is a series of well defined strips of alternating signal pattern 62 and signal pattern 64. Each strip will have its own center line which can define the center line of each track, or the common edge between adjacent strips of patterns 62 and 64 can be used to define the center line of the tracks.

Figure 7:
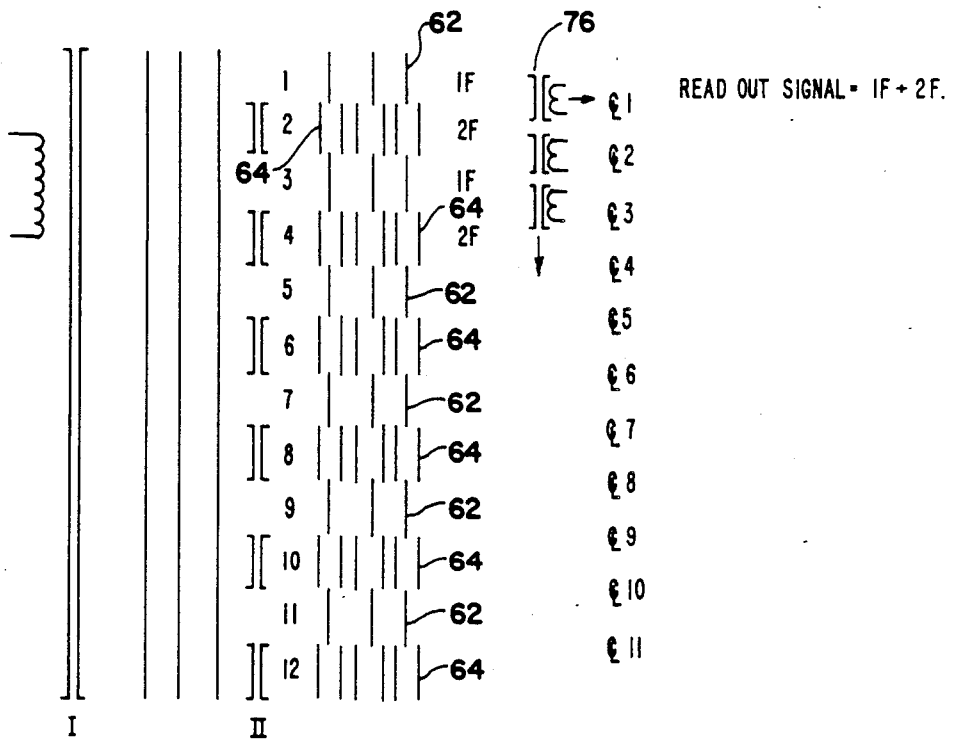
FIG. 7 illustrates a technique of defining the center lines of the multiple tracks defined by the pattern shown in FIG. 5 so that the read position of the single read head can be appropriately positioned with respect to each track.
Figure 8:
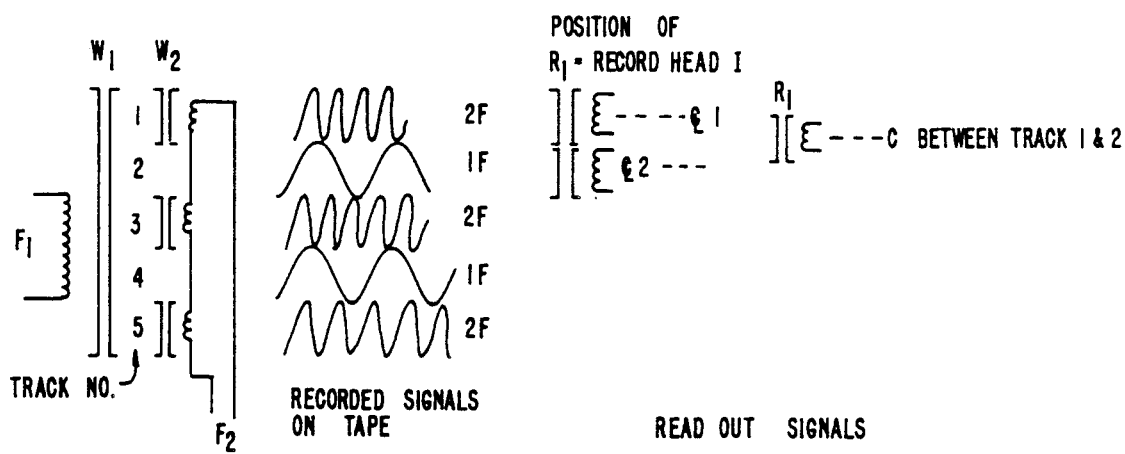
FIG. 8 shows an alternative of defining the center lines of the multiple tracks defined by the pattern shown in FIG. 5.

For example, as shown in FIG. 7, the center line of each track is defined by the common edge between adjacent strips of pattern 62 and 64 as indicated by the various positions of a read head 76 as it is moved across the width of the tape as the portion of the tape containing the signal pattern is moved over the read head. The length of the read head extending perpendicular to the direction tape is substantially equal to the width of one track. In this manner where head 32 includes a total of six slots 52 and six recording elements 54, eleven tracks will be defined as shown. Obviously, this number can vary by using a different number of slots and recording elements. The center line of each track can easily be sensed when the frequency output of the read head 76 as it reads the portion of the pattern contains both frequencies $F_1$ and $F_2$ of equal amplitude. Thus, by sensing the amplitude of the output signal of the read head at these two frequencies a control system can be easily constructed to control the position of the head based on comparison of these two amplitudes. Alternatively, as shown in FIG. 8 the center line of each track is defined by each strip of pattern 62 and pattern 64. In this manner the number of tracks will equal the number of slots 52 plus the number of recording elements 54 so that in the example given, this will result in twelve tracks. The center line of each track can easily be sensed when the frequency output of the read head is a maximum at the frequency $F_1$ and a minimum at the frequency $F_2$, or a minimum at the frequency $F_1$ and a maximum at the frequency $F_2$.

Figure 9:
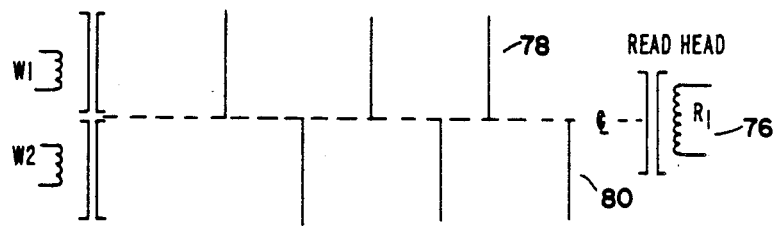
FIG. 9 shows an alternative track positioning signal pattern recorded on a tape in accordance with the method of the present invention.
Figure 10:
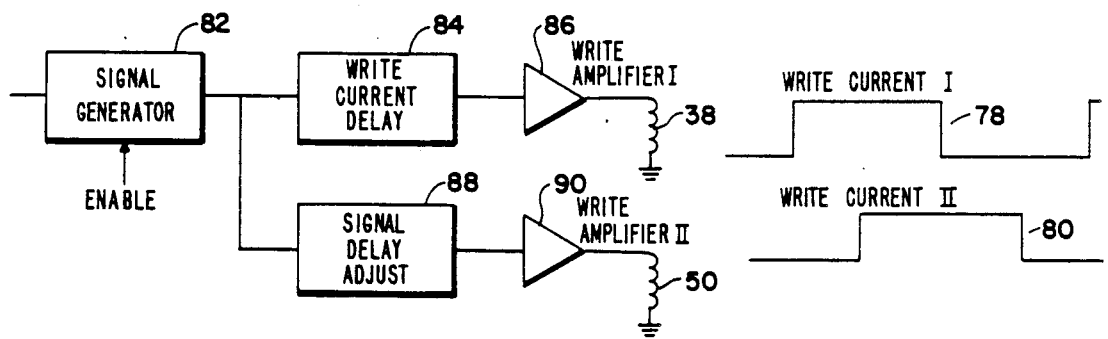
FIG. 10 shows a partial block and partial schematic diagram of signal generating means for generating the track positioning signal pattern shown in FIG. 9.

The two signal patterns shown in FIGS. 7 and 8 differ as to frequency. The two signals can vary as to phase as exemplified in FIGS. 9 and 10 which show the preferred signal pattern. More specifically, the two signals, identified by the patterns 78 and 80 respectively, applied by the respective heads 30 and 32, can be identical series of pulses but applied to the portion of the tape slightly out of phase with one another. This can easily be accomplished as shown in FIG. 10, wherein a signal generator 82 is adapted to generate a series of pulses. The output of the generator 82 is applied to a first delay 84 before being applied to the amplifier 86. The output of the latter is applied to the coil 38 of the head 30 as the portion of the tape receiving the signal pattern is moved over the head 30. The output of the generator 82 is also applied to a second signal delay 88 which provides sufficient delay to take into account the time it takes for a specific point on the tape to move from the head 30 to the head 32, and can be adjusted to provide the desired phase delay. The amount of phase delay is at least in part dependent on detection system used to detect the signal patterns and provide information regarding the position of the center line of each track. As shown in FIG. 9 the center line of the track is aligned with the center line of the read head 76 when the center line of the latter is aligned with the common edge between adjacent strips of the two signal patterns provided by the two heads 30 and 32. The resulting timing diagram of a pulse provided to the two heads is shown in FIG. 10 where the two are out of phase with one another as shown.

Figure 11:
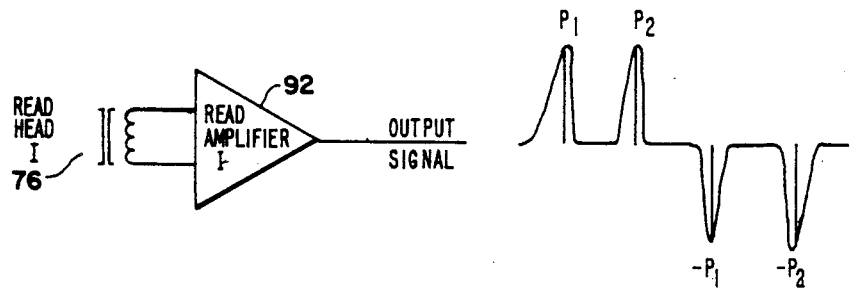
FIGS. 11, 12a, 12b and 12c illustrate a technique of defining the center lines of the multiple tracks defined by the pattern shown in FIG. 9 so that the read position of the signal read head can be appropriately positioned with respect to each track.
Figures 12A, 12B, 12C:
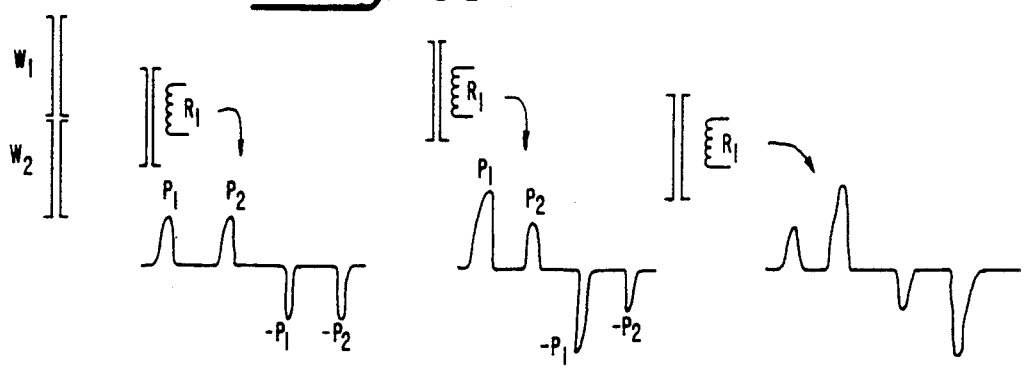

In this arrangement the read head detects the two adjacent signal patterns as shown in FIG. 11, where the detected signal pattern shown represents an alignment of the reading head with the track. For each positive transition of each pulse of the write signal provided by the heads 30 and 32, the output of the read amplifier 92 is a pulse of short duration indicated at $P_1$ (for the positive transition of the pulse provided by head 30) and $P_2$ (for the positive transition of the pulse provided by head 32). Similarly, for each negative transition of each pulse of the write signal provided by the heads 30 and 32, the output of the read amplifier 92 is a pulse of negative amplitude indicated at $-P_1$ (for the negative transition of the pulse provided by the head 30) and $-P_2$ (for the negative transition of the pulse provided by the head 32). As shown in FIG. 12, mistracking can easily be detected where FIG. 12a shows proper tracking, while FIGS. 12b and 12c show tracking off in the respective directions of the signal pattern provided by the heads 30 and 32. More specifically, as shown in FIG. 12b where the read head is positioned off track so as to detect more of the signal pattern provided by the head 30 than that provided by the head 32, the amplitude of the pulse provided by the head 30 will be greater than the amplitude of the pulse provided by the head 32. Accordingly, the pulse outputs $P_1$ and $-P_1$ will be of greater amplitude than the amplitudes of the pulse outputs of $P_2$ and $-P_2$. As shown in FIG. 12c, the result is opposite when the read head is misaligned so as to detect more of the signal pattern provided by the head 32 than that provided by the head 30. In the latter case, the amplitude of the pulses $P_1$ and $-P_1$ will be less than the amplitude of the pulses $P_2$ and $-P_2$. By controlling the position of the read head based on the relative amplitudes of $P_1$ and $P_2$ (and $-P_1$ and $-P_2$) the read head can be servo controlled so as to track the center line of the recording track having a center line defined by the common edge between the strips of adjacent signal patterns recorded by the two write heads 30 and 32.

Other signal patterns that can be used are shown in the remaining Figs. The composite signal pattern can be formed by providing a DC erase signal to one of the coils 38 or 50 so that recorded strips of erased portions of the tape are disposed between a recorded signal pattern provided from the other coil. Where the first coil 38 of head 30 is provided for example with a sinusoidal signal, the second coil 50 is provided with a DC signal so as to erase the portions of the tape moving over the recording elements 54. The resulting signal pattern is shown in FIG. 13a, with the track center lines being defined by either detecting the sinusoidal signal at its maximum peak amplitude ($E_o$) and its zero value, or at the common edge between adjacent strips of recorded information where the peak amplitude is $E_o/2$ as shown in FIG. 13b.

In FIG. 14 the pattern shown is provided by recording the same sinusoidal signal of finite duration with both heads 30 and 32, but delaying one signal until the other signal has been recorded so that on the tape the second signal starts at the position where the first signal ends. This can be accomplished with the writing device shown in FIG. 15, wherein the signal generator 94 provides a sinusoidal signal for a finite period. The signal is applied to the delay 96 before being applied to the amplifier 98, whereupon the signal is in turn applied to the coil 38. The signal output of the generator 94 is also applied to the delay 100, which in turn provides sufficient delay to allow the signal to be recorded by the head 30 and to take into account the amount of time it takes the tape to move from head 30 to head 32. The output of delay 100 is applied to amplifier 102, which in turn applies its output to the coil 50. When the read head is aligned with the common edge between adjacent strips of recorded signals of the two signal patterns, the two signals will be of equal amplitude as shown in FIG. 14. If however, the read head 76 is not properly aligned the amplitude of the signal will be greater for one signal than the other as illustrated in FIG. 15b.

In a manner well known in the art, the servo signals are prerecorded at specific intervals along the tape with data being storable in the respective tracks between the servo signals without erasing the servo signals. In this regard each tape drive can include a disabling device for disabling the write portion of the magnetic head when the read portion senses the servo signals so that the latter will not be erased from the tape as is well known.

In all of the arrangements shown the difference between the two types of signals recorded by the write heads 30 and 32 can be used to control the position of a single read head in a manner well known in the art. Thus, the specific detection schemes are not described in detail. For example, a detector for tracking a center line up or down is provided in tape drives such as the one sold by Irwin Magnetics of Ann Arbor, Mich.

The foregoing therefore provides an improved technique of simultaneously recording a pattern of servo signals for each track of a multi-track magnetic recording tape in a predetermined period of time as a function of tape speed and tape length and irrespective of the number of channels. The apparatus shown in FIGS. 3 and 4 make the technique easy. The time necessary to record the signals is significantly less than that employed by the prior art techniques. For example, where it may of taken one hour to record the servo signals, the same tape can be recorded in approximately 80 seconds.

Since certain changes may be made in the above apparatus and process without departing form the scope of the present invention herein involved, it is intended that all matter contained in the above description or shown in the accompanying drawing shall be interpreted in an illustrative and not in a limiting sense.

What is claimed is:

1. Apparatus for prerecording track positioning signals on a magnetic recording medium so as to accurately and simultaneously predefine a plurality of space apart recording tracks on said recording medium across the recording width of said medium, said apparatus comprising:

magnetic head means for simultaneously writing a track positioning signal pattern across the recording width of said magnetic recording medium so as to simultaneously define the positions of said tracks on said medium as a function of the locations of said signals on said medium, said magnetic head means comprising (a) a first write head for recording a first signal pattern on said recording medium, and (b) a second write head, spaced from first write head, for recording a second signal pattern on said recording medium recorded over portions of said first signal pattern so that said first and second signal patterns combine to create said track positioning signal pattern of n alternating steps of said first and second signal patterns so as to define at least n-1 of said recording tracks;

means for moving said magnetic recording medium relative to said first and second write heads so that said track positioning signal pattern is recorded on said medium; and means, coupled to said first and second write heads, for generating said first and second signal patterns as said recording medium is moved relative to said magnetic head means.

2. Apparatus according to claim 1, wherein said first write head is sized to extend and record the first signal pattern substantially across the recording width of said recording medium.

3. Apparatus according to claim 2, wherein said second write head is sized to extend and record the second signal pattern at predetermined and discrete locations across the recording width of the recording medium so that said second signal pattern is recorded as strips over said first signal pattern with said first signal pattern disposed between adjacent strips.

4. Apparatus according to claim 3, wherein said second write head includes a plurality of spaced-apart write head elements precisely spaced from one another by respective gaps of predetermined dimensions for recording said second signal pattern at said discrete locations where said write head elements record on said medium.

5. Apparatus according to claim 4, wherein said means for generating said first and second signal patterns includes a first signal generating means, coupled to said first write head, for generating a first signal representative of said first signal pattern, and second signal generating means, coupled to said second write head, for generating a second signal representative of said second signal pattern.

6. Apparatus according to claim 5, wherein said first signal is a first periodically varying signal and said second signal is a second identical periodically varying signal but out of phase with said first periodically varying signal so that the position of each of said tracks is defined by the signal phase difference between each strip of said recording medium defined by the recorded second periodically varying signal and the first periodically varying signal of said first signal pattern recorded between adjacent strips.

7. Apparatus according to claim 6, wherein the center line of each of said tracks is defined by a corresponding common edge between each of said strips of said recording medium defined by the recorded second periodically varying signal and the first periodically varying signal of said first signal pattern recorded between adjacent strips.

8. Apparatus according to claim 6, wherein said first signal is a first series of pulses and said second signal is a second series of pulses identical to but out of phase with said first series of pulses.

9. Apparatus according to claim 6, wherein said first signal is a first sinusoidal signal of a predetermined frequency and said second signal is a sinusoidal signal of identical frequency but out of phase with said first sinusoidal signal.

10. Apparatus according to claim 5, wherein said first signal is a first periodically varying signal of a first frequency and said second signal is a second periodically varying signal of a second frequency different from said first frequency so that the position of each of said tracks is defined by the detected frequency difference between each strip of said recording medium defined by the recorded second periodically varying signal and the first periodically varying signal of said first signal pattern recorded between adjacent strips.

11. Apparatus according to claim 10, wherein the center line of each of said tracks is defined by a corresponding common edge between each of said strips of said recording medium defined by the recorded second periodically varying signal and the first periodically varying signal of said first signal pattern recorded between adjacent strips.

12. Apparatus according to claim 10, wherein the center line of each of said tracks is defined by each of the center lines of each of said strips of said recording medium defined by the recorded second periodically varying signal and the center lines of the portions of said recording medium recorded with said first periodically varying signal between adjacent strips.

13. Apparatus according to claim 5, wherein one of said first and second signals is a periodically varying signal of a constant frequency and the other of said first and second signals is a constant amplitude signal so that the position of each of said tracks is defined by the detected amplitude of said periodically varying signal.

14. Apparatus according to claim 13, wherein the center line of each of said tracks is defined by a corresponding common edge between each of said strips of said recording medium defined by the recorded periodically varying signal and the constant amplitude signal.

15. Apparatus according to claim 14, wherein the center line of each of said tracks is defined by the detection of the maximum amplitude of said periodically varying signal.

16. Apparatus according to claim 14, wherein the center line of each of said tracks is defined by the detection of the maximum amount of said constant amplitude signal.

17. Apparatus according to claim 16, wherein said constant amplitude signal is a DC signal of an amplitude so as to erase the corresponding portions of said recording medium on which said constant amplitude is recorded.

18. A method of prerecording track positioning signals on a magnetic recording medium so as to accurately and simultaneously predefine a plurality of spaced apart recording tracks on said recording medium across the recording width of said medium, said method comprising the steps of:

simultaneously writing a track positioning signal pattern across the recording width of said magnetic recording medium so as to simultaneously define the positions of said tracks on said medium as a function of the locations of said signals on said medium, said step of writing comprising (a) recording a first signal pattern on said recording medium, and (b) recording a second signal pattern on said recording medium over portions o f the first signal pattern so that said first and second signal patterns combine to create said track positioning signal pattern of n alternating strips of said first and second signal patterns so as to define at least n-1 of said recording tracks;

moving said magnetic recording medium so that said track positioning signal pattern is recorded on said medium; and generating said first and second signal patterns as said recording medium is moved.

19. A method according to claim 18, wherein said step of recording said first signal pattern includes the step of recording said first signal pattern substantially across the recording width of said recording medium.

20. A method according to claim 19, wherein said step of recording said second signal pattern includes the step of recording said second signal pattern at predetermined and discrete locations across the recording width of the recording medium so that said second signal pattern is recorded as strips over said first signal pattern with said first signal pattern disposed between adjacent strips.

21. A method according to claim 20, wherein said second write head includes a plurality of spaced-apart write head elements precisely spaced from one another by respective gaps of predetermined dimensions for recording said second signal pattern at said discrete locations where said write head elements record on said medium.

22. A method according to claim 21, wherein said step of generating said first and second signal patterns includes the step of generating a first signal representative of said first signal pattern, and generating a second signal representative of said second signal pattern.

23. A method according to claim 22, wherein said step of generating said first and second signal patterns includes the steps of generating said first signal as a first periodically varying signal and said second signal as a second identical periodically varying signal but out of phase with said first periodically varying signal so that the position of each of said tracks is defined by the signal phase difference between each strip of said recording medium defined by the recorded second periodically varying signal and the first periodically varying signal of said first signal pattern recorded between adjacent strips.

24. A method according to claim 23, wherein the center line of each of said tracks is defined by a corresponding common edge between each of said strips of said recording medium defined by the recorded second periodically varying signal and the first periodically varying signal of said first signal pattern recorded between adjacent strips.

25. A method according to claim 23, wherein said step of generating said first and second signal patterns includes the steps of generating said first signal as a first series of pulses and said second signal as a second series of pulses identical to but out of phase with said first series of pulses.

26. A method according to claim 23, wherein said step of generating said first and second signal patterns includes the steps of generating said first signal as a first sinusoidal signal of a predetermined frequency and said second signal as a sinusoidal signal of identical frequency but out of phase with said first sinusoidal signal.

27. A method according to claim 22, wherein said step of generating said first and second signal patterns includes the steps of generating said first signal as a first periodically varying signal of a first frequency and said second signal as a second periodically varying signal of a second frequency different from said first frequency so that the position of each of said tracks is defined by the detected frequency difference between each strip of said recording medium defined by the recorded second periodically varying signal and the first periodically varying signal of said first signal pattern recorded between adjacent strips.

28. A method according to claim 27, wherein the center line of each of said tracks is defined by a corresponding common edge between each of said strips of said recording medium defined by the recorded second periodically varying signal and the first periodically varying signal of said first signal pattern recorded between adjacent strips.

29. A method according to claim 28, wherein the center line of each of said tracks is defined by each of the center lines of each of said strips of said recording medium defined by the recorded second periodically varying signal and the center lines of the portions of said recording medium recorded with said first periodically varying signal between adjacent strips.

30. A method according to claim 22, wherein said step of generating said first and second signal patterns includes the step of generating one of said first and second signals as a periodically varying signal of a constant frequency and the other of said first and second signals as a constant amplitude signal so that the position of each of said tracks is defined by the detected amplitude of said periodically varying signal.

31. A method according to claim 30, wherein the center line of each of said tracks is defined by a corresponding common edge between each of said strips of said recording medium defined by the recorded periodically varying signal and the constant amplitude signal.

32. A method according to claim 31, wherein the center line of each of said tracks is defined by the detection of the maximum amplitude of said periodically varying signal.

33. A method according to claim 31, wherein the center line of each of said tracks is defined by the detection of the maximum amount of said constant amplitude signal.

34. A method according to claim 33, wherein said constant amplitude signal is a DC signal of an amplitude so as to erase the corresponding portions of said recording medium on which said constant amplitude is recorded.

* * * * *

UNITED STATES PATENT AND TRADEMARK OFFICE
CERTIFICATE OF CORRECTION

PATENT NO. : 4,996,609
DATED : February 26, 1991
INVENTOR(S) : Kyriacos Joannou

It is certified that error appears in the above-identified patent and that said Letters Patent is hereby corrected as shown below:

Column 9:

Claim 1, line 41, delete "steps" and insert therefor -- strips --; and

Column 11:

Claim 18, line 31, delete "o f" and insert therefor -- of --.

Signed and Sealed this

Eighteenth Day of August, 1992

Attest:

DOUGLAS B. COMER

Attesting Officer

Acting Commissioner of Patents and Trademarks